United States Patent [19]

Plummer et al.

[11] Patent Number: 4,581,128

[45] Date of Patent: Apr. 8, 1986

[54] HYDROCARBON DESULFURIZATION PROCESS

[75] Inventors: Mark A. Plummer; Carle C. Zimmerman, Jr., both of Littleton, Colo.

[73] Assignee: Marathon Oil Company, Findlay, Ohio

[21] Appl. No.: 691,233

[22] Filed: Jan. 14, 1985

[51] Int. Cl.$^4$ ............................................. C10G 45/02
[52] U.S. Cl. .............................. 208/208 R; 208/213; 423/573 R; 423/588
[58] Field of Search .................. 208/213, 208 R, 209; 423/244 R, 573 R, 573 G, 575, 272, 590, 588, 584

[56] References Cited

U.S. PATENT DOCUMENTS

| | | | |
|---|---|---|---|
| 2,693,998 | 11/1954 | Kopsch | 23/207 |
| 2,819,950 | 1/1958 | Patton | 23/225 |
| 2,997,439 | 8/1961 | Nicklin et al. | 208/231 |
| 3,004,831 | 10/1961 | Hungerford et al. | 23/207 |
| 3,035,889 | 5/1962 | Nicklin et al. | 23/2 |
| 3,126,257 | 3/1964 | Kunowski et al. | 23/207 |
| 3,311,453 | 3/1967 | Lusby | 23/207 |
| 3,372,990 | 3/1968 | Charret | 23/207 |
| 3,752,885 | 8/1973 | Leibert et al. | 423/588 |
| 3,912,766 | 10/1975 | Logan et al. | 260/369 |
| 3,923,966 | 12/1975 | Vaughan | 423/573 |
| 3,937,795 | 2/1976 | Hasebe | 423/573 |
| 3,972,989 | 8/1976 | Fenton et al. | 423/573 |
| 4,002,727 | 1/1977 | Sonoda et al. | 423/573 |
| 4,041,130 | 8/1977 | Mackles | 423/573 G |
| 4,060,594 | 11/1977 | Fenton et al. | 423/573 |
| 4,061,721 | 12/1977 | Strong | 423/272 |
| 4,243,647 | 1/1981 | Hass et al. | 423/573 G |
| 4,304,762 | 12/1981 | Leigh | 423/272 |
| 4,432,962 | 2/1984 | Gowdy et al. | 423/573 R |

OTHER PUBLICATIONS

B. J. Young and R. L. Richardson, "Resid Desulfurizer a Year Later," Hydrocarbon Processing, Sep. 1977, pp. 103–108.

Lowenheim and Moran, *Faith, Keyes and Clark's Industrial Chemicals*, 4th Edition, John Wiley and Sons, 1975, pp. 489–491.

Shimizu, "Heavy Residual Oil Gasification Based on Texaco Partial Oxidation Process," *Chemical Economy and Engineering Review*, vol. 10, No. 7, Jul. 1978.

Primary Examiner—Andrew H. Metz
Assistant Examiner—Anthony McFarlane
Attorney, Agent, or Firm—Jack L. Hummel; Rodney F. Brown

[57] ABSTRACT

A sour liquid hydrocarbon feedstock is desulfurized upon contact with a hydrogen gas in the presence of a catalyst to obtain a low sulfur product and a hydrogen sulfide gas by-product. The hydrogen sulfide gas is treated with an anthraquinone which is dissolved in a solvent having a polarity which is greater than 3 Debye units, to produce sulfur and oxygen. The oxygen is used to oxidize a hydrocarbon fuel and produce the hydrogen gas used in the initial desulfurization step.

3 Claims, 1 Drawing Figure

HYDROCARBON DESULFURIZATION PROCESS

BACKGROUND OF THE INVENTION

1. Technical Field

The invention relates to a process for desulfurizing a sour hydrocarbon feedstock with hydrogen to produce a low sulfur hydrocarbon product, sulfur and by-products, from which hydrogen is regenerated for the desulfurization step.

2. Background Art

Many hydrocarbon feedstocks contain relatively high concentrations of sulfur, which limit the utility of the feedstock. In order to enhance the utility of the feedstock it is necessary to remove the sulfur contained therein.

A conventional process for the desulfurization of a sour feedstock includes contacting the feedstock with hydrogen gas in the presence of a catalyst to generate a hydrocarbon product having a relatively low sulfur concentration and a gaseous by-product consisting primarily of hydrogen sulfide. Conventional desulfurization of the sour feedstock has several inherent shortcomings. First of all, conventional desulfurization requires hydrogen gas which is usually obtained from the partial oxidization of a hydrocarbon fuel. This requires an oxygen feed in addition to the hydrocarbon fuel which is cryogenically extracted from air in a very expensive process. Handling of the hydrodesulfurization by-product, which is a gas consisting primarily of hydrogen sulfide, is also a significant problem.

The by-product gas is generally oxidized directly with air via the Claus process to produce sulfur and water. However, the Claus process has a number of inherent disadvantages. For example, it operates at high temperatures, it requires exacting process control over the ratio of oxygen to hydrogen sulfide in the feed, and the annual maintainence costs for the Claus Process are typically 20% of the initial capital investment. Finally the sulfur content of Claus process tail gas released to the atmosphere is generally too high to meet stringent environmental regulations. To comply with these regulations, it is necessary to have several Claus stages and to employ separate tail gas clean-up processes at great expense.

The art is rife with modified Claus processes and other hydrogen sulfide oxidization processes which attempt to overcome the deficiences of the basic Claus process. Hydrogen sulfide oxidization processes, which include U.S. Pat. No. 2,819,950 to Patton, U.S. Pat. No. 3,311,453 to Lusby and U.S. Pat. No. 3,923,966 to Vaughan, have not substantially overcome the deficiencies of the basic Claus process.

A process is needed for desulfurizing a sour hydrocarbon feedstock with hydrogen gas, which can provide an economic source of hydrogen gas and which also converts the by-product gases to useful, environmentally-acceptable products.

SUMMARY OF THE INVENTION

The present invention is a process for desulfurizing a hydrocarbon feedstock having a relatively high sulfur content by contacting the feedstock with hydrogen gas in the presence of a catalyst to obtain a hydrocarbon product having a relatively low sulfur content. The hydrogen sulfide gas by-product produced therewith is treated with a quinone to obtain a sulfur product and a hydroquinone. The hydroquinone is regenerated by contacting it with air in the presence of a catalyst. The resulting quinone is recycled back to the absorption reaction while hydrogen peroxide produced as a by-product is reduced to oxygen and water. The oxygen is used to partially oxidize a hydrocarbon fuel which generates hydrogen gas. The hydrogen gas is recycled to the initial desulfurization step.

The process provides an economical means for desulfurizing the sour feedstock, especially where a hydrocarbon fuel is readily available. Furthermore, the by-products of the desulfurization process are either utilized in subsequent process steps, converted to useful products or readily disposed in an environmentally compatible manner.

BRIEF DESCRIPTIONS OF THE DRAWINGS

FIG. one is a flowsheet showing the operations and streams in the process of the present invention.

DESCRIPTION OF THE PREFERRED EMBODIMENT

Figure 1:
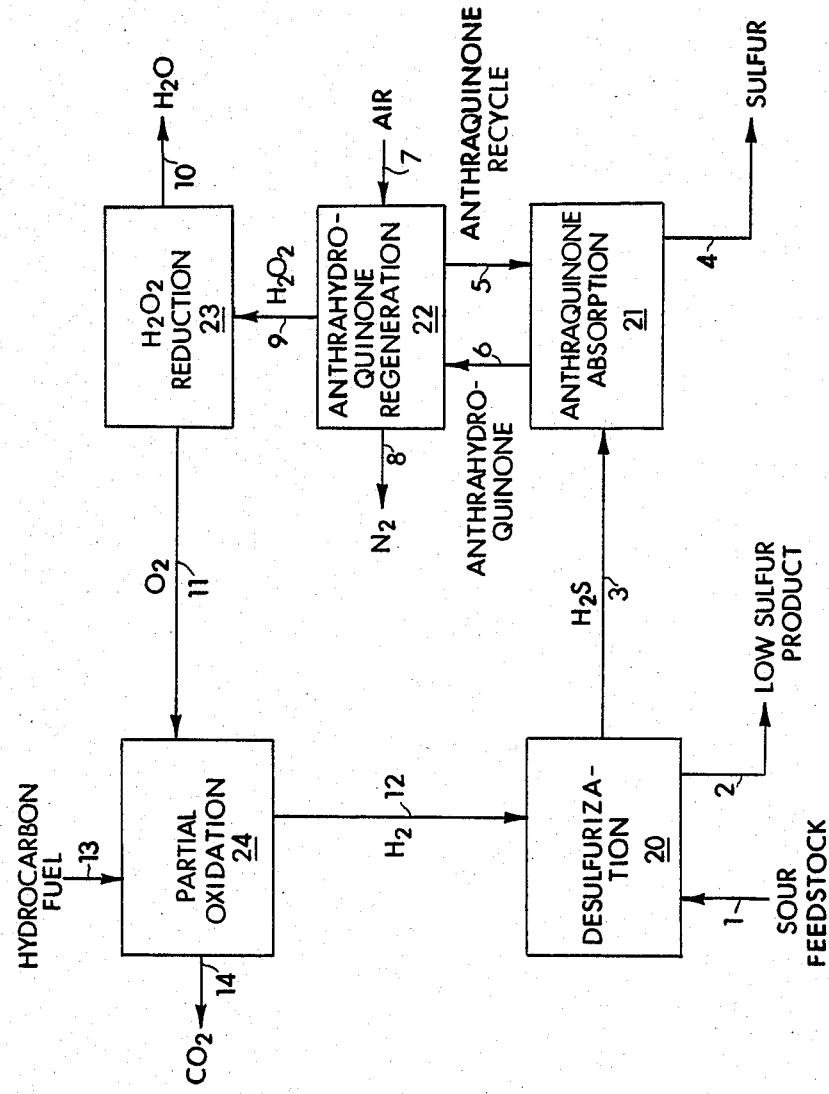

The process of the present invention can be used to treat virtually any sour liquid hydrocarbon feedstock requiring a reduced sulfur content. Exemplary feedstocks include crude oil, residual oil, shale oil, and tar sands all having an unacceptably high sulfur content. Referring to FIG. 1, the sour feedstock 1 is first fed to a hydrodesulfurizer 20. The desulfurizer catalytically reacts hydrogen gas ($H_2$) 12 with the sour feedstock to produce a useful low sulfur hydrocarbon product 2 and a hydrogen sulfide ($H_2S$) by-product gas 3. The hydrodesulfurization step is a conventional process known in the art as described, for example, in B. J. Young and R. L. Richardson, "Resid desulfurizer a year later," *Hydrocarbon Processing*, September 1977, pp. 103–108.

The $H_2S$ by-product gas is treated to produce useful compounds and environmentally acceptable by-products therefrom. The $H_2S$ is first fed to an anthraquinone absorption reactor 21 wherein the $H_2S$ is contacted with an anthraquinone, which is dissolved in a polar organic solvent. Although the $H_2S$ stream may also contain small amounts of carbon dioxide ($CO_2$) or other unreactive compounds, the solvent preferentially solubilizes only the $H_2S$ portion of the feed gas upon contact. This solution is maintained in the reactor at a temperature from about 30° to about 80° C. and at an $H_2S$ partial pressure from about 600 to about 1200 kPa for a time sufficient to convert the $H_2S$ and anthraquinone to sulfur and anthrahydroquinone. This is generally from about 0.1 to 3 hours, depending on the polarity of the solvent. The anthraquinone concentration in the reaction solution is not critical, although a higher concentration favors an increased reaction rate, which is preferred. The upper concentration limit of anthraquinone is its saturation point in the particular solvent at the reaction temperature.

It is believed that the mechanism for conversion of $H_2S$ to sulfur is by two chemical reactions. The first is an $H_2S$-anthraquinone reaction, a two step reaction. The $H_2S$ first contacts the solvent to form a quaternary ion complex which in turn reacts with the anthraquinone to yield elemental sulfur and the corresponding anthrahydroquinone. The second reaction is the sulfur polymerization reaction, which polymerizes elemental sulfur to polymerized sulfur. The polymerized sulfur then precipitates out of solution.

A primary parameter controlling both the H₂S-anthraquinone and sulfur polymerization reactions is the choice of solvent in the reaction solution. Increasing solvent polarity has two favorable effects on these reactions: (1) the extent of reaction increases; and (2) the total time for the H$_2$S-anthraquinone and sulfur polymerization reactions decreases. Preferred solvents are organic compounds which have a high polarity, i.e., greater than about 3 Debye units, yet remain stable at dehydrogenation temperatures. These solvents include nitrobenzene, 2-pyrrolidone, n,n-dimethylacetamide, 1,3-dimethyl urea and n,n-dimethylformamide. The most preferred solvent is n-methyl-2-pyrrolidone (NMP).

Other important process parameters are the choice of anthraquinone as well as the process temperature and pressure. Optimization of the process requires balancing competing factors. For example, each step of the H$_2$S-anthraquinone reaction optimally proceeds within a different temperature range. Quaternary ion complex formation is favored at lower temperature and anthraquinone to anthrahydroquinone conversion is favored at higher temperature. An optimal temperature generally compromises these two factors. With respect to pressure, increased H$_2$S partial pressure increases both quaternary ion complex formation and desirably higher anthraquinone conversion. However, a large quaternary ion complex concentration undesirably increases the sulfur polymerization time.

In general, a preferred anthraquinone maximizes H$_2$S conversion to sulfur. Choice of the anthraquinone is based on such properties as the solubility of anthraquinone in the organic solvent and the electro-negativity of the anthraquinone. Solubility is a function of the groups substituted on the anthraquinone. For example, alkyl anthraquinones have much higher solubilities than sulfonated anthraquinones. Likewise, electronegativity is a function of the anthraquinone substituents. Useful anthraquinones are ethyl anthraquinone and t-butyl anthraquinone because they have relatively high electronegativities, enabling them to more effectively attract positive hydrogen ions from the quaternary ion complex and increase the conversion of the anthraquinone to the corresponding anthrahydroquinone.

The reaction solution from absorption reactor 21 contains anthrahydroquinone, solvent, sulfur product, and any unreacted compounds from the feed gas. The sulfur product 4 is separated from the reaction solution as an insoluble sulfur precipitate, e.g., S$_8$ or other forms of polymerized sulfur, by filtration, centrifugation, or other means known in the art and dried or melted to a liquid form. The solution is then heated to a temperature of from about 200° to about 350° C. at a pressure from about atmospheric to about 1000 kPa to remove the unreacted compounds, if any, for recycle to the absorption reactor. The reaction solution is then fed to the regeneration reactor 22 where the anthrahydroquinone 6 is catalytically or thermally converted to anthraquinone 5 and hydrogen peroxide 9 upon contact with air 7. Typical operating conditions in reactor 22 are described in Lowenheim and Moran, *Faith, Keyes and Clark's Industrial Chemicals*, 4th Edition, John Wiley and Sons, 1975, pp. 489-491. The solution withdrawn from the reactor contains the anthraquinone 5 in its initial form dissolved in the polar organic solvent. The solution is recycled to the absorption reactor 21 and spent air consisting primarily of nitrogen gas (N$_2$) 8 is produced as a by-product.

Hydrogen peroxide (H$_2$O$_2$) 9 is produced in the anthrahydroquinone regeneration reactor 22. It is fed to the H$_2$O$_2$ reduction reactor 23 wherein it is thermally or catalytically degraded to produce oxygen (O$_2$) 11 and water 10 as a by-product. Catalytic degradation is carried out at ambient atmospheric temperature and pressure by contacting the H$_2$O$_2$ with a decomposition catalyst, including ferric oxide, manganese dioxide, silver or copper. Thermal degradation is carried out simply by heating the H$_2$O$_2$ until O$_2$ evolves.

O$_2$ 11 is fed to a partial oxidation reactor 24 where it is contacted with a hydrocarbon fuel 13 to produce H$_2$ 12 and carbon dioxide (CO$_2$) 14 as a by-product. The hydrocarbon fuel 13 can be any hydrocarbon having a high H/C ratio such as methane gas or even a heavy residual fuel oil. The partial oxidation process is a conventional process such as that described in Shimizu, "Heavy Residual Oil Gasification Based on Texaco Partial Oxidation Process," *Chemical Economy and Engineering Review*, Volume 10, Number 7, July 1978. The H$_2$ thereby produced is fed into the desulfurization reactor 20, completing the process cycle.

The preferred embodiment of the invention is set forth below by example but is not to be construed as limiting the scope of the invention.

EXAMPLE 1

A gas oil containing 2.5 wt. % sulfur is contacted with hydrogen gas in the presence of a commercial cobalt catalyst at a temperature of 350°–400° C. and 4800 kPa of hydrogen pressure to obtain a treated gas oil and a hydrogen sulfide (H$_2$S) by-product gas. The treated gas oil contains 0.25 wt. % sulfur.

The H$_2$S is contacted with t-butyl anthraquinone dissolved in n-methyl-2-pyrrolidone (NMP) at a temperature of 56°–59° C. and 980 kPa of H$_2$S pressure to produce sulfur and t-butyl anthrahydroquinone in the NMP solution. The sulfur is removed from solution and the remaining NMP solution, containing the t-butyl anthrahydroquinone, is contacted with air at 30°–60° C. to regenerate the t-butyl anthraquinone and produce hydrogen peroxide.

The hydrogen peroxide is contacted with a manganese dioxide-ferric oxide catalyst at a temperature of 25° C. and atmospheric pressure to produce oxygen. The oxygen is reacted with natural gas and water at 1200°–1500° C. 1500–3500 kPa and 1.0–1.2 moles O$_2$/equivalent of carbon in the natural gas to produce a synthesis gas containing hydrogen, carbon dioxide and carbon monoxide. The hydrogen is used for additional gas oil desulfurization.

Examples 2–7 describe selection of a solvent and an anthraquinone and optimization of H$_2$S-anthraquinone reaction parameters.

EXAMPLE 2

H$_2$S and t-butyl anthraquinone are dissolved in several solvents. They are then reacted in the H$_2$S reactor at optimum conditions to determine which combination of reactants and solvents yields the greatest conversion of anthraquinone to anthrahydroquinone. The results are set forth in Table 1 below.

TABLE 1

| Solvent | Temp (°C.) | $H_2S$ Partial Pressure (kPa) | Polarity (Debye units) | % Conversion |
|---|---|---|---|---|
| Diethylamine | 37 | 83 | 1.1 | 0 |
| Quinoline | 44–55 | 83–1048 | 2.2 | 0 |
| Acetophenone | 43–56 | 83–1117 | 3.0 | 0 |
| 2-Pyrrolidone | 54 | 83 | 3.6 | 7 |
| n,n-Dimethylformamide | 52–63 | 83–1124 | 3.9 | 40 |
| n-Methyl-2-Pyrrolidone (NMP) | 57 | 1082 | 4.1 | 53 |
| 40% 1,3 Dimethyl Urea - 60% NMP | 58 | 979 | 4.4 | 65 |
| Hexamethyl Phosphoric Triamide | 54 | 83 | 5.5 | 78 |

Table 1 indicates that only solvents having a polarity above about 3 Debye units can be used for conversion of t-butyl anthraquinone to the corresponding anthrahydroquinone. The data also show that conversion increases as solvent polarity increases.

EXAMPLE 3

$H_2S$ and t-butyl anthraquinone are dissolved in two different solvents to determine the relationship between reaction time and solvent polarity. The reactions are carried out at temperatures from 54° to 60° C. and at $H_2S$ partial pressures from 965 to 1117 kPa. The reaction time using pure NMP solvent, having a polarity of 4.1 Debye units, is 2.5 hours while the reaction time using a solvent mixture comprised of 60 wt.% NMP and 40 wt.% 1,3 dimethyl urea, having a polarity of 4.4 Debye units, is only 0.5 hours. As solvent polarity increases, reaction time appears to decrease.

EXAMPLE 4

The conversion of t-butyl anthraquinone to t-butyl anthrahydroquinone is maximized as a function of temperature. The reactions are carried out at several temperatures for 2.5 hours at $H_2S$ partial pressures between 965 to 1089 kPa in NMP solvent. The results are shown in Table 2 below.

TABLE 2

| Temperature (°C.) | % Conversion |
|---|---|
| 45 | 44 |
| 52 | 49 |
| 56 | 53 |
| 57 | 52 |
| 59 | 53 |
| 63 | 50 |
| 69 | 44 |
| 76 | 38 |

Optimum temperature for maximum t-butyl anthraquinone conversion to t-butyl anthrahydroquinone in NMP solvent is about 56° to 59° C.

EXAMPLE 5

The conversion of t-butyl anthraquinone to the corresponding anthrahydroquinone is maximized as a function of $H_2S$ partial pressure. The reactions are carried out at several $H_2S$ partial pressures for 2 to 2.75 hours at a temperature between 56° and 59° C. in NMP solvent. The results are listed in Table 3 below.

TABLE 3

| $H_2S$ Partial Pressure (kPa) | % Conversion |
|---|---|
| 83 | 10 |
| 634 | 50 |
| 772 | 57 |
| 979 | 62 |
| 1048 | 57 |
| 1082 | 51 |
| 1102 | 48 |

Optimum $H_2S$ partial pressure for maximum t-butyl anthraquinone conversion to t-butyl anthrahydroquinone is about 980 kPa.

EXAMPLE 6

$H_2S$ and ethyl anthraquinone are dissolved in n,n-dimethylformamide solvent and reacted at 52° C. and an $H_2S$ partial pressure of 83 kPa for 2.5 hours. About 34% of the ethyl anthraquinone is converted to ethyl anthrahydroquinone.

EXAMPLE 7

$H_2S$ and t-butyl anthraquinone are dissolved in n,n-dimethylformamide solvent and reacted under the same conditions as Example 6. About 44% of the t-butyl anthraquinone is converted to t-butyl anthrahydroquinone. The higher conversion of the anthraquinone to anthrahydroquinone in Example 7 compared to Example 6 is attributed to the presence of the t-butyl group on the anthraquinone. The t-butyl group makes the anthraquinone more electronegative, enabling it to more effectively attract hydrogen ions from the quaternary ion complex formed between the $H_2S$ and the n,n-dimethylformamide solvent.

While the foregoing preferred embodiment of the invention has been described and shown, it is understood that all alternatives and modifications, such as those suggested and others, may be made thereto and fall within the scope of the invention.

We claim:

1. A process for converting a sour hydrocarbon feedstock having a relatively high sulfur content to a hydrocarbon product having a relatively low sulfur content comprising the steps of:
   (a) hydrodesulfurizing said feedstock having a relatively high sulfur content upon contact with hydrogen to produce said hydrocarbon product having a relatively low sulfur content and hydrogen sulfide gas;
   (b) contacting said hydrogen sulfide gas with an anthraquinone dissolved in a polar organic solvent having a polarity greater than about 3 Debye units to produce sulfur and an anthrahydroquinone in said solvent;
   (c) regenerating said anthraquinone from said anthrahydroquinone upon contact with air to produce said anthraquinone and hydrogen peroxide;
   (d) recycling said anthraquinone to step (b);
   (e) reducing said hydrogen peroxide to oxygen and water;
   (f) partially oxidizing a hydrocarbon fuel with said oxygen to produce carbon dioxide and hydrogen; and
   (g) recycling said hydrogen to step (a).

2. The process of claim 1 wherein said polar organic solvent is n-methyl-2-pyrrolidone.

3. The process of claim 1 wherein said anthraquinone is selected from the group consisting of t-butyl anthraquinone and ethyl anthraquinone.

* * * * *